United States Patent
Campbell et al.

(10) Patent No.: US 9,998,551 B1
(45) Date of Patent: Jun. 12, 2018

(54) AUTOMATIC DISCOVERY AND REGISTRATION OF SERVICE APPLICATION FOR FILES INTRODUCED TO A USER INTERFACE

(71) Applicant: Palantir Technologies Inc.

(72) Inventors: Adam Campbell, New York, NY (US); Ashwin Ramaswamy, New York, NY (US); Juan Tamayo, San Francisco, CA (US); Lee Avital, New York, NY (US); Taylor Morgan, New York, NY (US); Thomas Hasner, New Brunswick, NJ (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days. days.

(21) Appl. No.: 15/403,904

(22) Filed: Jan. 11, 2017

Related U.S. Application Data

(60) Provisional application No. 62/412,155, filed on Oct. 24, 2016.

(51) Int. Cl.
*G06F 17/30* (2006.01)
*H04L 29/08* (2006.01)
*H04L 29/06* (2006.01)

(52) U.S. Cl.
CPC ........ *H04L 67/16* (2013.01); *G06F 17/30076* (2013.01); *G06F 17/30091* (2013.01); *G06F 17/30106* (2013.01); *G06F 17/30112* (2013.01); *G06F 17/30864* (2013.01); *H04L 63/102* (2013.01)

(58) Field of Classification Search
CPC ......... G06F 17/30126; G06F 17/30091; G06F 17/30106; G06F 9/445; G06F 9/44505; H04L 67/16; H04L 41/5054; H04L 61/1541
USPC ......................................... 707/736, 827, 822
See application file for complete search history.

(56) References Cited

U.S. PATENT DOCUMENTS

| | | | |
|---|---|---|---|
| 6,058,373 A | 5/2000 | Blinn et al. | |
| 7,409,405 B1 * | 8/2008 | Masinter ................. | G06F 9/445 |
| 7,685,109 B1 | 3/2010 | Ransil et al. | |
| 8,285,860 B2 | 10/2012 | McGuire et al. | |
| 8,819,106 B1 | 8/2014 | Sirota et al. | |
| 8,832,675 B1 * | 9/2014 | Abderrazzaq ....... | G06F 9/44505 |
| | | | 717/169 |
| 8,850,528 B2 | 9/2014 | Van Biljon et al. | |
| 9,256,657 B1 | 2/2016 | Evenson et al. | |
| 9,521,194 B1 | 12/2016 | Gabrielson | |
| 2004/0044727 A1 | 3/2004 | Abdelaziz et al. | |
| 2005/0228711 A1 | 10/2005 | Lahey et al. | |
| 2007/0005801 A1 | 1/2007 | Kumar et al. | |
| 2007/0105597 A1 | 5/2007 | Hwang | |
| 2007/0168336 A1 | 7/2007 | Ransil et al. | |

(Continued)

*Primary Examiner* — Dennis Truong
(74) *Attorney, Agent, or Firm* — Hickman Palermo Becker Bingham LLP

(57) ABSTRACT

A catalog system automatically detects changes to configuration file at a service application. Based on the changes to the configuration file(s), the catalog system stores mapping data that identifies a resource item type that can be processed by the service application and one or more user actions that are available for processing resource items of the resource item type. The techniques thus provide for dynamic interaction with service applications.

20 Claims, 8 Drawing Sheets

(56) References Cited

U.S. PATENT DOCUMENTS

| | | |
|---|---|---|
| 2009/0132317 A1 | 5/2009 | Dholakia et al. |
| 2009/0132710 A1 | 5/2009 | Pelley |
| 2010/0057515 A1 | 3/2010 | Gandini et al. |
| 2010/0186020 A1 | 6/2010 | Maddhirala et al. |
| 2010/0235525 A1 | 9/2010 | McGuire et al. |
| 2011/0131448 A1 | 6/2011 | Vasil et al. |
| 2012/0180068 A1 | 7/2012 | Wein et al. |
| 2013/0080507 A1* | 3/2013 | Ruhlen ............ H04L 67/16 709/203 |
| 2013/0275398 A1* | 10/2013 | Dorman ........ G06F 17/30126 707/693 |
| 2014/0101310 A1* | 4/2014 | Savage ............ H04W 4/003 709/224 |
| 2014/0289244 A1* | 9/2014 | Procopio ....... G06F 17/30126 707/736 |
| 2014/0310328 A1 | 10/2014 | Charif et al. |
| 2014/0310720 A1 | 10/2014 | Song et al. |
| 2014/0379777 A1 | 12/2014 | Yamamoto et al. |
| 2015/0172412 A1 | 6/2015 | Escriva et al. |
| 2017/0285981 A1 | 10/2017 | DeArment et al. |
| 2017/0285982 A1 | 10/2017 | DeArment et al. |

* cited by examiner

AUTOMATIC DISCOVERY AND REGISTRATION OF SERVICE APPLICATION FOR FILES INTRODUCED TO A USER INTERFACE

CROSS-REFERENCE TO RELATED APPLICATIONS; BENEFIT CLAIM

This application claims the benefit of U.S. Provisional Application No. 62/412,155, filed Oct. 24, 2016, the entire content of which is hereby incorporated by reference as if fully set forth herein, under 35 U.S.C. § 119(e).

TECHNICAL FIELD

The technical field of the present disclosure relates to registration of service applications in computer networks. More specifically, the disclosure relates to computer-implemented techniques for automatic discovery of service applications in networks, and registration of the service applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In distributed systems, files of different file types can be processed by different applications. However, interacting with various different applications to provide the files to the applications directly can be inefficient. Maintaining a centralized portal for interacting with different applications can also be challenging, as it requires revising the settings for the centralized portal whenever an application goes online, offline, or changes its handling of files. Thus, there is a need for techniques to dynamically interface files with different applications.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
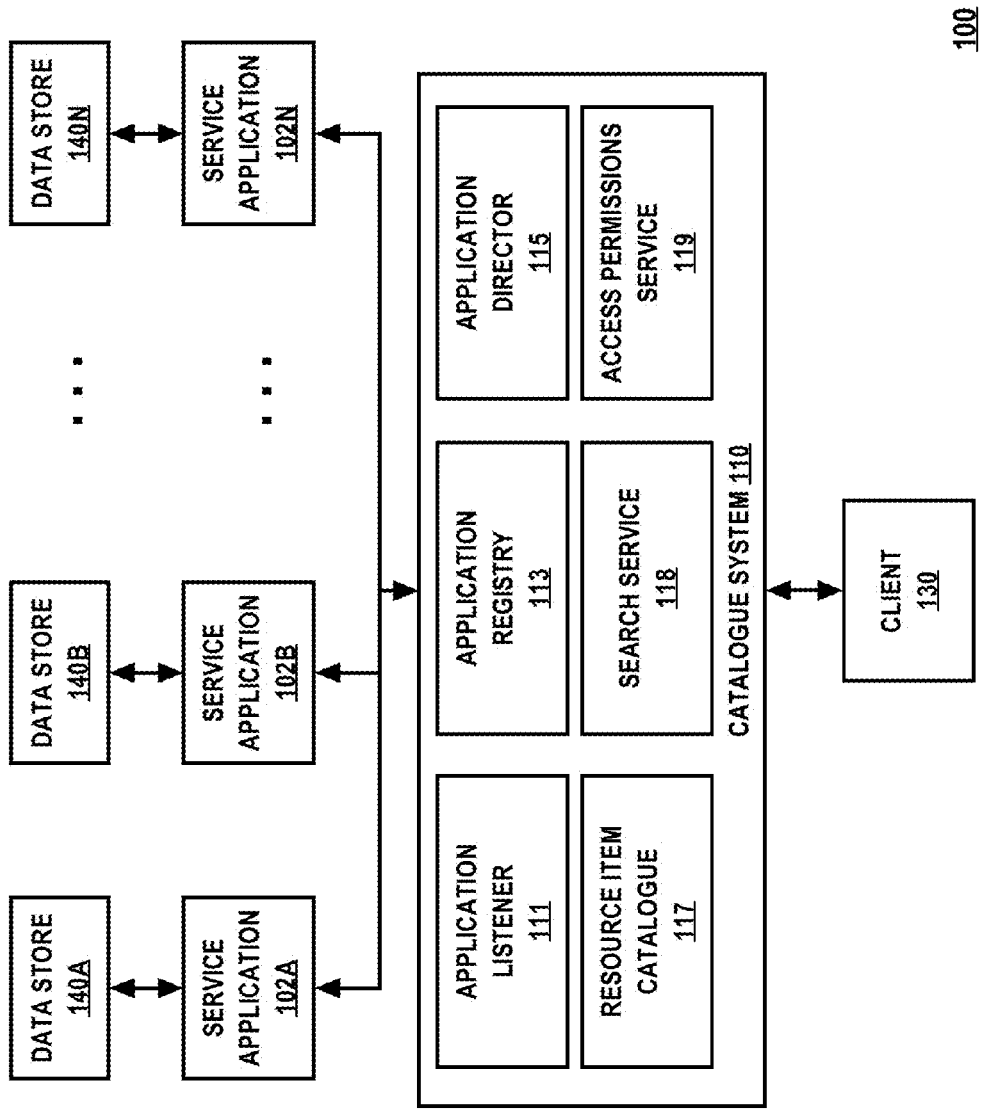
FIG. 1 is a block diagram of an example system in which the example embodiment(s) of the present invention may be implemented.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 RESOURCE ITEMS
   2.2 SERVICE APPLICATION
     2.2.1 CONFIGURATION FILE
   2.3 CATALOGUE SYSTEM
     2.3.1 APPLICATION LISTENER
     2.3.2 APPLICATION REGISTRY
     2.3.3 APPLICATION DIRECTOR
     2.3.4 RESOURCE ITEM CATALOGUE
     2.3.5 SEARCH SERVICE
     2.3.6 ACCESS PERMISSIONS SERVICE
   2.4 CLIENT
3.0 EXAMPLE PROCESSES AND ALGORITHMS
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE

1.0 General Overview

In a distributed system, multiple applications can be used for processing different types of files. For example, a first application may be used for processing spreadsheet files and a second application may be used for processing image files. Processing may include any type of computer-implemented techniques, and may include storing, viewing, editing, graphing, charting, visualizing, analyzing, transformation of data, or any other instructions for the manipulation of digital information.

A catalogue system can be used to serve as a centralized system for the various applications. The catalogue system can serve as a single point of entry for a client device to access data that is being processed across such disparate applications. However, in widely distributed systems with dozens of service applications, it can be challenging to keep track of which applications can process files of a particular file type. Moreover, the changing topology of the available applications means that different applications can be added and/or removed from the system over time. Furthermore, applications may add, remove, or modify functionality for handling files of particular file types.

The present techniques allow for a catalogue system to dynamically monitor configuration files at service application. In response to detecting changes to a configuration file at particular application, the catalogue system can update mapping data based on the configuration file. The mapping data indicates what file types the particular application can process. The mapping data further indicates what user actions are available for further processing at the particular application.

Upon detecting a new file at a client device, the catalogue system can use the mapping data to route the file, based on the file type, to the appropriate application for processing. The catalogue system can store catalogue information that identifies which application has been sent the file. Thus, the catalogue system can be used as a card catalogue for tracking files that have been previously sent to applications for processing.

Upon detecting user input at a client device that is attempting to interact with a file stored at an application, the catalogue system can cause to be displayed at the client device one or more user actions that can be performed on the file, based on the configuration file. In response to a selection of a user action, the catalogue system can cause the application to perform the selected user action on the file.

The present system provides for the automatic and dynamic detection of changes to configuration files of applications. The present system further provides for the dynamic routing of files to the appropriate application for processing, based on changes detected at configuration files. The present system provides a centralized catalogue system for a client device to interact with files being stored and/or processed at various applications. The present system does not require the catalogue system to be reconfigured or restarted. Instead, changes to application handling of files can be performed at the applications themselves, by modifying the application's configuration file. This allows for disparate teams to change configuration settings for what files the application processes and what user actions can be performed on files being processed by the application, without having to modify the catalogue system. Such change are automatically detected by the catalogue system and reflected in the routing of data to the applications and the user actions that are displayed via the client device. Thus, disparate teams can take ownership of their particular application and be fully integrated with the catalogue system without having to modify the catalogue system directly.

2.0 Example Computer System Implementation

FIG. 1 illustrates an example computer system 100 in which the techniques described herein may be practiced, according to some embodiments. In the example of FIG. 1, system 100 is programmed or configured to discover applications automatically in a distributed network and to register the applications automatically in data records managed by the system. System 100 may be implemented across one or more physical or virtual computing devices, none of which is intended as a generic computer, since it is loaded with instructions in a new ordered combination as otherwise disclosed herein to implement the functions and algorithms of this disclosure. The example components of system 100 shown in FIG. 1 are implemented at least partially by hardware at one or more computing devices, such as one or more hardware processors executing stored program instructions stored in one or more memories for performing the functions that are described herein. Or, one or more virtual machine instances in a shared computing facility such as a cloud computing center may be used. The functions described herein are intended to indicate operations that are performed using programming in a special-purpose computer or general-purpose computer, in various embodiments.

System 100 illustrates only one of many possible arrangements of components configured to execute the programming described herein. Other arrangements may include fewer or different components, and the division of work between the components may vary depending on the arrangement.

System 100 comprises one or more service applications 102A, 102B, 102N. For purposes of illustrating a clear example, three (3) instances of service applications are shown in FIG. 1, but the ellipsis in FIG. 1 and the label "N" in "102N" is intended to indicate that any number of service applications may be present in other embodiments. Each of the service applications 102A, 102B, 102N may be any process, system, application, program, script, job, daemon, and/or server that is programmed or configured to process or store a resource item, dataset or electronic document. Examples include a word processing application, spreadsheet application, database application, data transformation application, data analysis application, and the like. Further details regarding service applications 102A, 102B, 102N are described herein in other sections.

One or more of service applications 102A, 102B, and/or 102N may be coupled to data stores 140A, 140B, 140N, respectively. For purposes of illustrating a clear example, three (3) instances of data stores are shown in FIG. 1, but the ellipsis in FIG. 1 and the label "N" in "140N" is intended to indicate that any number of data stores may be present in other embodiments. Each of the data stores may be any repository that is programmed or configured for storing or managing collections of data. For example, a data store may be programmed or configured for storing or managing resource items. Examples of data stores include database management systems, file systems, source code repositories, or any other similar system for storing data. In one embodiment, each of service applications 102A, 102B, and 102N may be coupled to a unique data store 140A, 140B, and 140N, respectively. However, in another embodiment, one or more of service applications 102A, 102B, and 102N may share one more data stores 140A, 140B, and 140N. In another embodiment, a service application 102A may be coupled to multiple data stores 140A, 140B, and/or 140N.

System 100 comprises a catalogue system 110. A catalogue system may be a system that is programmed or configured to automatically discover and register one or more service applications for processing resource items. Catalogue system 110 may be implemented across one or more computing devices. Service applications 102A, 102B, 102N are communicatively coupled to catalogue system 110. For example, service applications 102A, 102B, 102N may be communicatively coupled to catalogue system 110 via a network, such as the Internet or a private network. Further details regarding catalogue system 110 are described herein in other sections.

Catalogue system 110 may include an application listener 111 that is programmed or configured to detect changes to configuration files at service applications 102A though 102N.

Catalogue system 110 may include an application registry 113 that is programmed or configured to store mapping data that maps which service applications 102A, 102B, 102N can process resource items of a particular type. Application registry 113 may be further programmed or configured to store data that identifies which user actions for data processing can be applied to resource items by service applications 102A, 102B, 102N.

Catalogue system 110 may include application director 115 that is programmed or configured to detect new or modified resource items and determine, based on the application registry 113, which service applications 102A, 102B, 102N should be notified regarding the new or modified resource item. In one embodiment, application director 115 may be programmed or configured to transmit the new or modified resource item to the appropriate service application 102A, 102B, 102N.

Catalogue system 110 may include resource item catalogue 117 that stores catalogue metadata information regarding resource items available at one or more service applications 102, including, but not limited to the location and/or file path of the resource item at the service application 102. Thus, resource item catalogue 117 can serve as a card catalogue for client devices that are attempting to locate data stored or processed at service application.

Catalogue system 110 may include a search service 118 that is programmed or configured to index and/or perform searches for resource items stored or processed by service applications 102A, 102B, 102N. Searches may be performed based on a search query provided by a client 130. Search results may be generated, and provided to the client 130.

Catalogue system 110 may include access permissions service 119 that is programmed or configured to store user access permissions that indicate whether a particular user account can view, edit, process, and/or interact with particular resource items.

System 100 comprises a client 130. Client 130 may be implemented across one or more computing devices, such as a mobile computing device, tablet computer, desktop computer, or laptop computer, none of which is intended as generic, since it is loaded with instructions in a new ordered combination as otherwise disclosed herein to implement the functions and algorithms of this disclosure. Client 130 may be accessible to a user and may provide a user interface for a user to access one or more resource items of the system 100. The user interface may be provided via an application, a web service, or some other graphical display. Client 130 is communicatively coupled to catalogue system 110. For example, client 130 may be communicatively coupled to catalogue system 110 via a network, such as the Internet or a private network.

In one embodiment, service applications 102A, 102B, 102N, catalogue system 110, and client 130 are implemented on different computing devices, however, in another embodiment, one or more of service applications 102A, 102B, 102N, catalogue system 110, and client 130 are implemented on the same computing device.

2.1 Resource Items

A "resource item" may be any computer-implemented digital information, such as a file, a data object, a database entry, a data message, or any other similar computer implemented digital information. Some non-limiting examples of a resource item include, but are not limited to, a word processing document, a spreadsheet document, a digital image, a dataset, and other types of files, documents, and digital media. A resource item may correspond to a standardized or conventional file type such that the content of the resource item conforms to a standardized or conventional data format associated with that file type. Some standardized and conventional file types to which a resource item may correspond to include, but are not limited to, image file types (e.g., .jpg, .tiff, .gif, .png), music file types (e.g., .mp3, .aiff, .m4a, .wav), movie file types (e.g., .mov, .mp4, .m4v), word processing file types (e.g., .doc, .docx, .pages), presentation file types (e.g., .ppt, .pptx, .key), spreadsheet file types (e.g., .csv, .xls., .xlsx, .numbers), web page file types (e.g., .htm, .html), and text file types (e.g., .txt). While in some instances a resource item corresponds to a standardized or conventional file type, a resource item corresponds to a proprietary or unknown file type in other instances. A resource item can also include folders or other mechanisms of grouping resource items together with different behaviors, such as collections, playlists, albums, etc. For example, an account can include a photos folder that is intended for photos and that provides specific attributes and actions tailored for photos; an audio folder that provides the ability to play back audio files and perform other audio related actions; or other special purpose folders. The above discussion provides just some examples of possible types of resource items.

A resource item may include metadata that describes various characteristics of the resource item, including, but not limited to, a resource item name, resource item type, resource item identifier, access permissions for the resource item, or any other digital information that represents a characteristic of the resource item. In one embodiment, a resource item type refers to a file type of the resource item. For example, a ".png" file and a ".jpg" file would be different resource types. In another embodiment, a resource item type refers to a general categorization of the resource item. For example, a ".png" file and a ".jpg" file could share the same "Image" resource item type, as both files are image files. In one embodiment, a resource item identifier is a unique identifier of the resource item.

2.2 Service Application

System 100 includes one or more service applications 102A, 102B, 102N. A service application may be any process, system, application, script, job, and/or server programmed or configured to process or store a resource item. For example, a service application 102 may be an application server, a job process, a database, or a filesystem. In one embodiment, a service application 102 may be programmed or configured to process resource items of one or more particular types, as will be described herein.

Examples of service applications can be any sort of application that is capable of processing a resource item. Examples of processing a resource item include, but are not limited to storing a resource item, viewing a resource item, editing a resource item, analyzing a resource item, performing optical character recognition on a resource item, generating a graph, chart, or other visualization of a resource item, modifying a resource item, transforming a resource item, extracting a resource item, scrubbing data related to a resource item, making calculations based on a resource item, or any other data processing of a resource item that may be performed by computer-implemented instructions.

Service applications 102A, 102B, 102N may be coupled to one or more data stores 140A, 140B, 140N. Each of the data stores 140A, 140B, 140N is programmed or configured to manage or store resource items. In one embodiment, each of service applications 102A, 102B, and 102N may be coupled to a unique data store 140A, 140B, and 140N, respectively. However, in another embodiment, one or more of service applications 102A, 102B, and 102N may share one more data stores 140A, 140B, and 140N. In another embodiment, a service application 102A may be coupled to multiple data stores 140A, 140B, 140N.

2.2.1 Configuration File

In one embodiment, each service application 102A, 102B, 102N may comprise one or more configuration files that provide configuration settings for the service application. The configuration settings may define various characteristics of the particular service application 102, including, but not limited to, the types of resource items that the service application can process. In one embodiment, the configuration setting may further define the types of action(s) that can be performed on resource items by the service application.

In one embodiment, a configuration file of a service application can be implemented in any markup language or data format syntax, such as extensible markup language (XML), "YAML Ain't Markup Language" (YAML), or JavaScript Object Notation (JSON), and is stored in the form of digital data in a storage device or digital memory.

In one embodiment, a configuration file may include a unique identifier that identifies the service application. A configuration file may further include an identification of one or more resource item types that the service application is able to process. For example, if a particular service application is capable of viewing and/or editing images, the configuration file for the service application may indicate that the service application can process resource items with an "Image" resource item type. In another example, if a particular service application is capable of creating charts, graphs, and/or visualizations of a spreadsheet resource item, the configuration file for the service application may indicate that the service application can process resource items with a spreadsheet file type.

A configuration file may further include an identification of one or more user actions that the associated service application can be used to process a resource item. For example, if a particular service application is capable of viewing and editing images, the configuration file for the service application may indicate that the service application can perform either a "view" user action or an "edit" user action for a resource item with an "Image" resource item type. In another example, if a particular service application is capable of creating charts and/or graphs of a spreadsheet resource item, the configuration file for the service application may indicate that the service application can perform either a "Chart" user action or a "Graph" user action for a resource item with a "Spreadsheet" resource item type.

TABLE A illustrates an example of an excerpt of a configuration file for a service application named "ACME" that is capable of viewing and/or editing resource items with a resource item type that matches "*.jpg", according to one embodiment:

TABLE A

```
serviceApplicationIdentifier:   ACME
   action:
      match:    *.jpg
      method:   GET
      name:     "View Image"
      url:      "{{self( ).url }}/view"
      displayHint:
         icon:    icon-image-resource-item
         label:   Image
      priority: 1
   action:
      match:    *.jpg
      method:   GET
      name:     "Edit Image"
      url:      "{{self( ).url}}/edit"
      displayHint:
         icon:    icon-image-resource-item
         label:   Image
      priority: 2
   seviceApplicationPriority:  1
```

The configuration file illustrated in TABLE A includes a unique identifier, denoted by the "serviceApplicationIdentifier" tag that identifies the ACME service application.

The configuration file illustrated in TABLE A further identifies two user actions, denoted by the "action" tags. The first user action is a "View Image" user action and the second user action is an "Edit Image" user action, as denoted by the respective "name" tags. The "View Image" user action and "Edit Image" user action may each be used to process resource items that match "*.jpg", as denoted by the respective "match" tags. Thus, the "match" tag may identify matching criteria that may be used to identify resource items, by resource item type, which can be processed by the service application. In one embodiment, matching criteria can be applied to a file name of a resource item, however, in another embodiment, matching criteria can be applied to any metadata associated with the resource item. In one embodiment, the matching criteria can include a regular expression for identifying resource item types that can be processed using the service application. The regular expression can be applied to metadata for a resource item to determine whether the service application can process the resource item.

The configuration file illustrated in TABLE A further identifies link, a uniform resource identifier (URI), or uniform resource locator (URL) for processing a resource item using an action, as denoted by the respective "url" tags in the present example. In another embodiment, any instruction for processing a resource item using a user action can be specified in a configuration file, such as a method call, function call, script, job, process, or similar instruction.

The configuration file illustrated in TABLE A further identifies various visual characteristics for displaying the resource items that match the user action, as shown with the respective "displayHint" tags. These visual characteristics can be displayed in a graphical user interface to provide a client device with options for interacting with a resource item.

In one embodiment, the configuration file illustrated in TABLE A further identifies a priority associated with one or more user actions. For example, in TABLE A, the "View Image" user action has a priority of 1, while the "Edit Image" user action has a priority of 2, as denoted by the "priority" tags. In one embodiment, the configuration file illustrated in TABLE A further identifies a priority associated with the service application as a whole, as identified with the "serviceApplicationPriority" tag. These different priority settings may be used for determining which service applications are used for processing a resource item, the order of processing a resource item by multiple service applications that can handle the same resource item type, and/or the order of displaying user actions for processing a user action. For example, in one embodiment, all service applications that match a resource item type of a resource item are used for processing the resource item. However, in another embodiment, only the service application with the highest priority is used for processing a resource item type.

Thus, the configuration file of a service application contains various configuration settings that allow a catalogue system 110 to determine what resource item types the service application can process, what user actions the service application can offer for processing a resource item, how the service application can perform the associated user action, and how to generate graphical user interface elements for interaction with the service application.

2.3 Catalogue System

Catalogue system 110 serves as a central point of entry for client 130 to service applications 102A, 102B, 102N. Catalogue system 110 can detect changes to configuration files for service applications 102A, 102B, 102N and dynamically adapt the routing and processing of resource items in response to those changes. Thus, a change to a service application 102 can be automatically and dynamically reflected in catalogue system 110 without having to modify the code or settings of the catalogue system. Catalogue system 110 can also serve as a virtual card catalogue for locating resource items that have been routed and/or processed by service applications 102A, 102B, 102N.

2.3.1 Application Listener

Catalogue system 110 may include an application listener 111 that is programmed or configured to detect changes to configuration files at a service application 102. Changes to a configuration file at a service application 102 can include creation of a new configuration file, modification of an existing configuration file, and/or deletion of an existing configuration file.

In one embodiment, a service application 102 sends a message to application listener 111 that notifies the application listener 111 that a configuration file associated with service application 102 has been created, modified, and/or deleted. The message can be sent, by the service application 102 when it initializes, or when the configuration file has been changed. The message may optionally include a copy of the configuration file or a subset of the configuration file.

In one embodiment, a service application 102 registers with application listener 111 to indicate that it is an available service application. In one embodiment, during the registration process, the service application 102 provides a configuration file to the application listener 111.

In another embodiment, the application listener 111 can detect changes to a configuration file at service application 102 without service application 102 registering with application listener 111. For example, in one embodiment, application listener 111 may poll a specific directory or file path associated with service application 102 where it can check for a configuration file. By polling the directory or file path, the application listener 111 can thus determine if there are any changes to a configuration file associated with a service application 102. For example, application listener 111 can identify newly added or deleted configuration files at the directory or file path. Alternatively, application listener 111 can compare a modification timestamp for an existing configuration file to a previously stored modification timestamp in order to determine if the configuration file has been recently modified. In one embodiment, the frequency with which a directory or file path is polled may be configured via a setting.

2.3.2 Application Registry

Catalogue system 110 may include an application registry 113 that is programmed or configured to store mapping data that maps which service applications 102A, 102B, 102N can process resource items of a particular type. Application registry 113 may be further programmed or configured to store data that identifies which user actions for data processing can be applied to resource items by service applications 102A, 102B, 102N.

In one embodiment, once the application listener 111 detects that changes have been made to a configuration file associated with a service application 102, the application registry 113 can store the configuration settings from the configuration file. As described earlier, the configuration file contains various settings, including, but not limited to, a unique identifier for the service applications, one or more user actions that can be performed by the service application, matching criteria that can be used to identify resource items that can be processed by the service application, and priorities associated with processing a resource item by the service application. The application registry 113 may store any of the configuration settings from the configuration file, to allow the catalogue system 110 to determine how to process resource items.

Thus, in one embodiment, application registry 113 may store mapping data, wherein the mapping data is generated based on the configuration file. The mapping data may include a plurality of map entries, wherein each map entry associates a designated resource item type to the service application 102. In one embodiment, each map entry further maps a user action to the service application 102. The mapping data may be used by the catalogue system 110, to determine how to process a resource item.

2.3.3 Application Director

Catalogue system 110 may include application director 115 that is programmed or configured to detect new or modified resource items and determine, based on the application registry 113, which service applications 102A, 102B, 102N should be notified regarding the new or modified resource item. For example, in one embodiment, application director 115 may detect a new resource item uploaded, created, or modified by a user via a file viewer at a client 130. In another embodiment, application director 115 may detect a new resource item or a change to an existing resource item at service application 102A, 102B, or 102N. In another embodiment, application director 115 may detect a new resource item or a change to am existing resource item at data store 140A, 140B, or 140N. Based on detecting the change to the resource item, the application director 115 can use the application registry to C13 to identify one or more service applications 102A, 102B, 102N that can be used for processing the resource item.

In one embodiment, application director 115 may be programmed or configured to transmit the new or modified resource item to the appropriate service application 102A, 102B, 102N, based on the information stored in the application registry 113. In one embodiment, service application 102A, 102B, 102N may store the resource item in the appropriate data store 140A, 140B, 140N. This allows the application director 115 to route the resource item to the appropriate service application for processing based on the configuration settings obtained and stored by the application registry 113. Thus, upon detecting the new resource item at client 130, the catalogue system 110 can route the resource item to the appropriate service application 102 for processing without having to store a local copy of the resource item at the catalogue system 110. This distributed system allows the catalogue system 110 to serve as an intermediary for routing resource items between client 130 and service applications 102A, 102B, 102N, while allowing the service application 102A, 102B, 102N to handle the actual processing of the resource item.

Returning to the example of TABLE A, wherein the ACME service application is used for processing files that match "*jpg" criteria, the application director 115 can detect a new JPG image named "Screenshot_2016-09-29.jpg" at a client 130. In response to detecting the new JPG image, the application director 115 can use the mapping data stored at application registry 113, which indicates that the ACME service application can be used for processing the resource items that match "*jpg" as a file name. Based upon this determination, the application director 115 can transmit a copy of the "Screenshot_2016-09-29.jpg" resource item to the ACME service application for processing. Thus, the application director 115 is able to route the new resource item, using the application registry 113, to the appropriate service application 102.

In one embodiment, when multiple service applications are configured to handle the same type of resource item, the priority associated with each service application can be used by the application director 115 to determine which service applications should be used for processing the resource item. In one embodiment, the application director 115 will only use the service application 102 with the highest priority for processing a resource item. In another embodiment, the service application 102 will use all service applications 102 that match the resource item type for processing the resource item; however, they will be transmitted in order, based on priority. Thus, those service applications 102 with a higher priority will be sent the resource item first, and those service applications 102 with a lower priority will be sent the resource item later. Thus, the catalogue system 110 provides a granularity for prioritizing the processing of the resource items across multiple service applications 102A, 102B, 102N.

2.3.4 Resource Item Catalogue

Catalogue system 110 may include resource item catalogue 117 that stores catalogue metadata information regarding resource items available at one or more service applications 102, including, but not limited to their location and/or file path. Thus, resource item catalogue 117 can serve as a card catalogue for client devices that are attempting to locate data stored or processed at service application.

For example, in the example of TABLE A, after the "Screenshot_2016-09-29.jpg" image file transmitted to an ACME service application for processing, the resource item catalogue 117 can be used to store catalogue metadata information that indicates that the "Screenshot_2016-09-29.jpg" is being stored and/or processed by the ACME service application, as well as the relative location and/or file path of the image file at the ACME service application. This allows the catalogue system 110 to serve as a card catalogue for the location of resource items being processed by service applications 102A, 102B, 102N without having to store the actual contents of the resource items. If a client 130 needs to access the image at a later time, the resource item catalogue 117 can be used to look up and determine the location of the resource item at a service application. In one embodiment, the resource item catalogue 117 can be used to generate a link to a resource item being processed by a service application 102. For example, resource item catalogue 117 can be used to generate a user action link for processing a resource item at a service application 102. This allows catalogue system 110 to be a lightweight layer for routing traffic to service applications 102A, 102B, 102N without having to incur the overhead necessary to store a local copy of the resource items.

In one embodiment, resource item catalogue 117 can store any resource item metadata associated with a resource item sent to a service application 102, thereby providing more comprehensive information that can be used for locating resource items.

2.3.5 Search Service

Catalogue system 110 may include a search service 118 that is programmed or configured to index and/or perform searches for resource items stored or processed by service applications 102A, 102B, 102N. A search query may be received by search service 118 from client 130.

In one embodiment, the search service 118 can index the contents of the resource item catalogue 117 to allow for a user to easily search for resource items being processed by service applications 102A, 102B, 102N. When search service 118 receives a search query, via client 130, for a particular resource item being processed a service application 102, the search service 118 can use can use the index and the resource item catalogue 117 to generate and return search results that match the search query.

In one embodiment, since the resource item catalogue 117 does not store the actual contents of the resource items, the search service 118 can additionally send requests to service applications 102A, 102B, 102N to return search results in response to receiving a search query. Relaying such search queries to service applications 102A, 102B, 102N can be slower, as it will require communicating with individual service applications, however, it will allow the search service 118 to provide more comprehensive search results to the search query, as the search results will include matches to the search query based on the contents of the resource item in addition to the metadata regarding the resource items stored by the resource item catalogue 117.

In one embodiment, catalogue system 110 may cause to be displayed at client 130 the search results of processing the search query.

2.3.6 Access Permissions Service

Catalogue system 110 may include access permissions service 119 that is programmed or configured to store user access permissions that indicate whether a particular user account can view and/or edit particular resource items. The user access permissions may further indicate whether a particular user account can view and/or access processing by a particular service application. In one embodiment, user access permissions may be customized based on user account, groups of user accounts, particular resource items, and groups of resource items such as folders, or particular device used as client 130.

In one embodiment, any time a user account tries to access, upload, process, or search for a resource item via catalogue system 110, catalogue system 110 may be programmed or configured to first send a request to access permissions service 119 to determine whether the user account has appropriate user permissions first. If the user account does not have appropriate user permissions, the request can either generate an error or hide a subset of data for which the user account does not have appropriate permission.

2.4 Client

Client 130 may be any computing device, such as a smartphone, tablet, desktop computer, laptop computer, server computer, etc. that is programmed or configured as set forth herein. Client 130 thus provides an entry point for a user to interact with catalogue system 110. Client 130 may be programmed or configured to display a user interface based on instructions received from catalogue system 110. Client 130 is communicatively coupled to catalogue system 130, for example, via a network.

Figure 2:
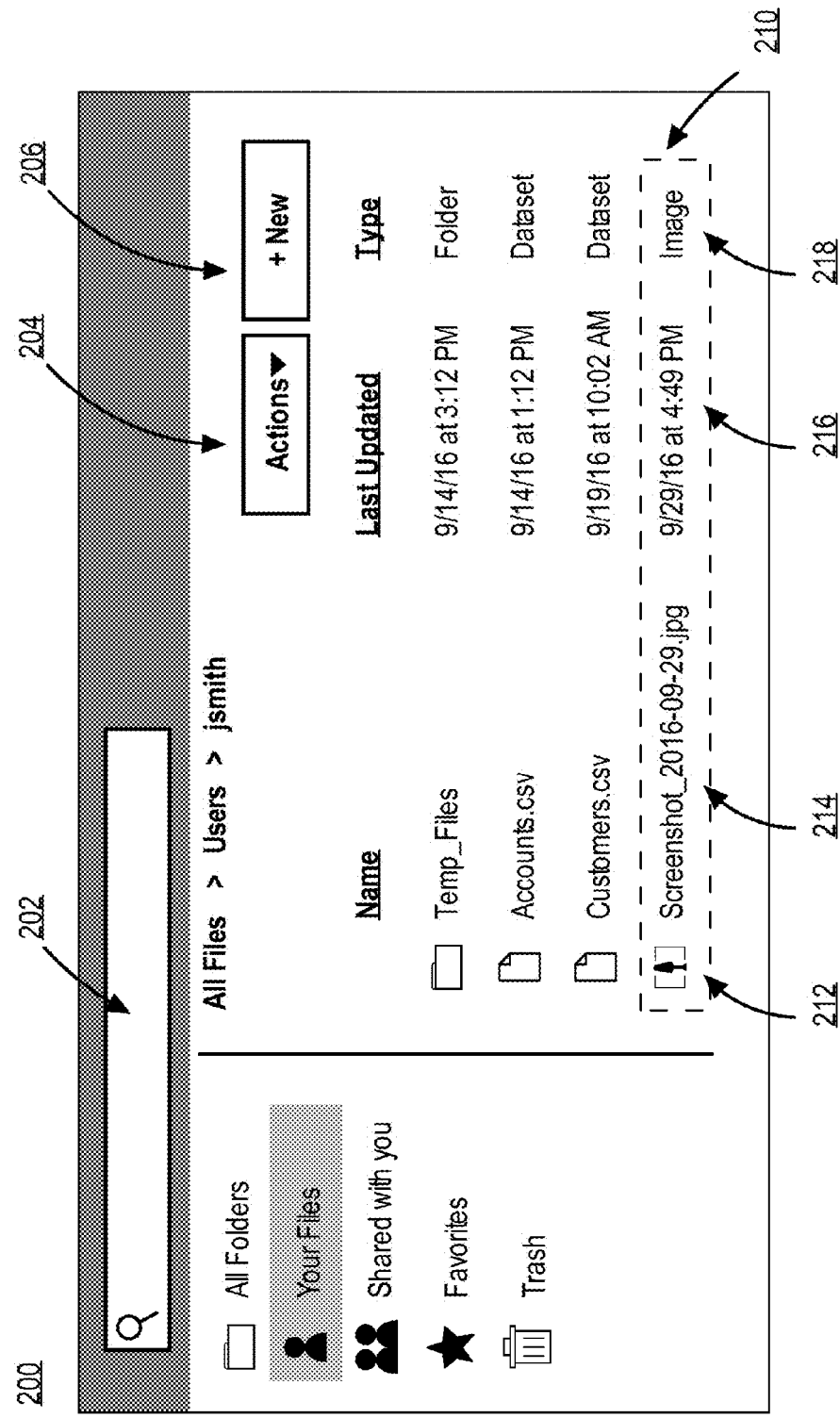
FIG. 2 illustrates an example user interface, according to one embodiment.

FIG. 2 illustrates an example user interface 200 of client 130, according to one embodiment. User interface 200 may display information regarding one or more resource items. For example, row 210 displays information regarding a resource item that has been uploaded to a service application for processing. The information displayed as part of row 210 may be generated based on data stored in application registry 113 and/or resource item catalogue 117. Row 210 includes an icon 212 that illustrates the type of resource item. In one embodiment, icon 212 may be configured as part of a configuration file associated with a service application 102. Row 210 may include a name 214 which is the name of the resource item. Row 210 may include a timestamp 216. In this particular example, timestamp 216 indicates when the resource item was last updated, however, in other embodiments, additional timestamp data may be displayed. Row 210 may include a type 218 that indicates a resource item type of the resource item. The type 218 may be determined based on the configuration file associated with a service application 102. In other embodiments, row 210 may depict any other information associated with the resource item and/or the service application(s) available for processing the resource item.

User interface 200 further includes an actions button 204 that may be used to display one or more available user actions for a selected resource item. User interface 200 further includes a new resource item button 206 that may be used for uploading new resource items to the catalogue system 110, according to one embodiment. In one embodiment, user interface 200 may include search box 202 for performing searches using search service 118. Search box 202 may be used for receiving user input for a search query.

Figure 3:
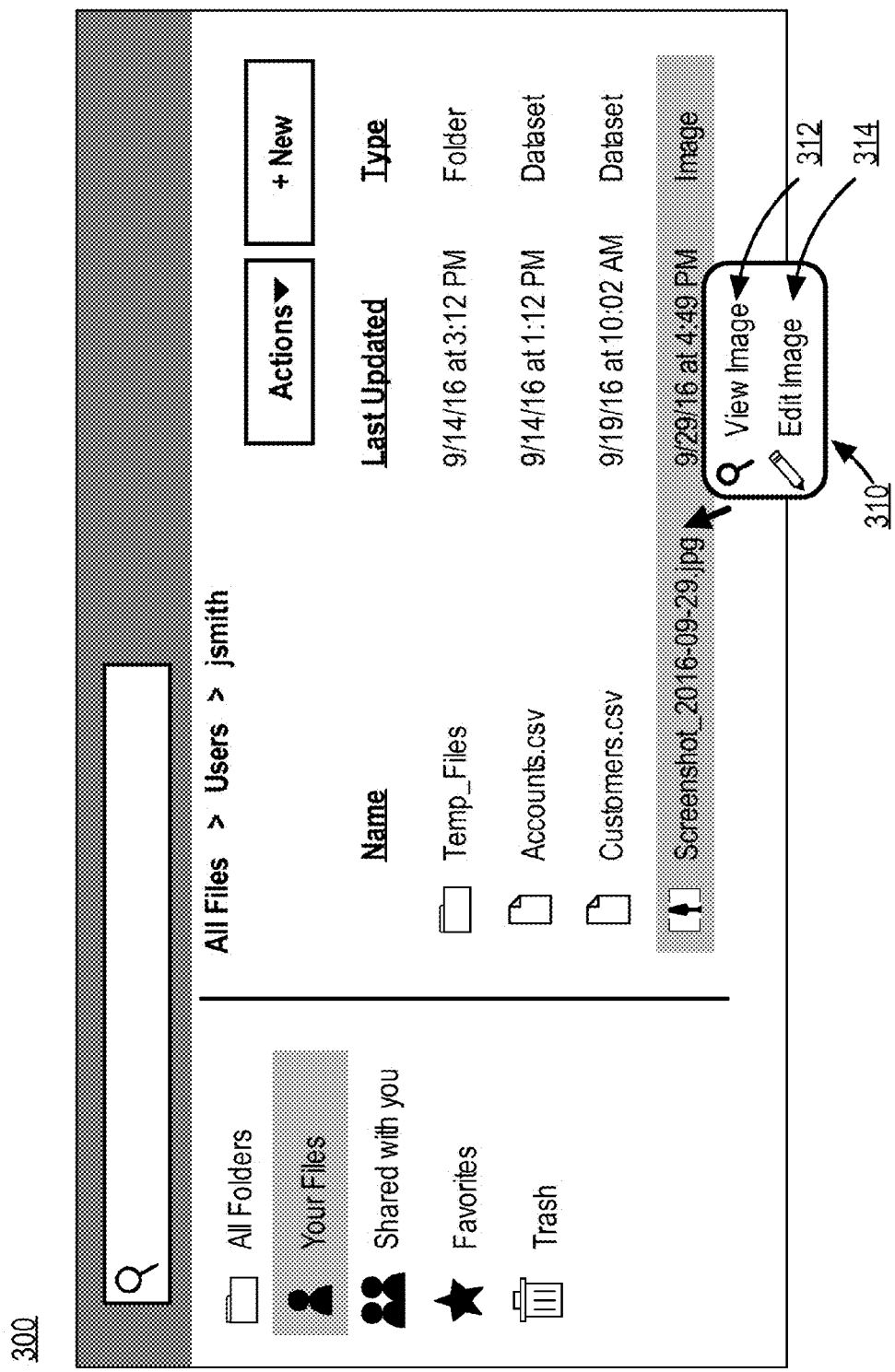
FIG. 3 illustrates an example user interface, according to one embodiment.

FIG. 3 illustrates an example user interface 300 of client 130 according to one embodiment. In the example of user interface 300, the row 210 from user interface 200 has been selected. In response, the user interface 300 depicts a popup window 310 that shows two available user actions for the selected resource item. The listing of available user actions can be determined based on application registry 113. In this particular example, popup window shows two available user actions 312 and 314 for "View Image" and "Edit Image". The user actions 312 and 314 can be determined from application registry 113 based on one or more configuration files, such as the exemplary configuration file of TABLE A. In one embodiment, user actions 312 and 314 may further include icons that were also determined from application registry 113. When either of user actions 312 or 314 are selected by a user input, catalogue system 110 is programmed to cause the corresponding user action to be performed by the service application on the resource item that is selected. For example, an appropriate link or URL for the user action may be executed. Thus, the present system provides techniques for dynamically generating lists of available user actions for a user to process resource items being processed by service applications. Thus, catalogue system 110 provides a single point of entry for a user to interact with resource items being processed by various service applications 102A, 102B, 102N.

3.0 Example Processes and Algorithms

Figure 4:
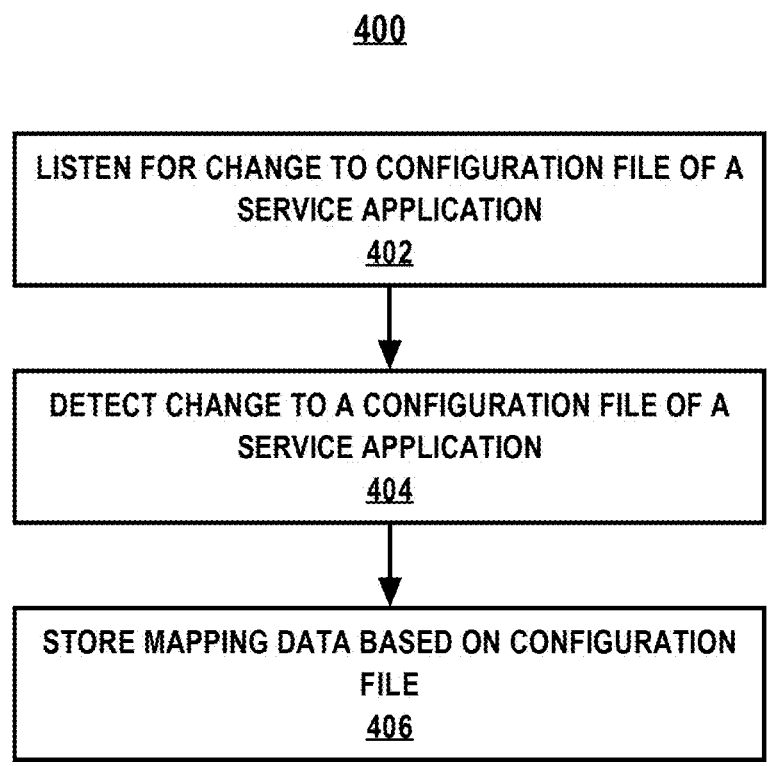
FIG. 4 illustrates a flow diagram for a process for detecting changes to a configuration file, according to one embodiment.

FIG. 4 illustrates a flow diagram of an example process 400 for detecting changes to a configuration file, according to one embodiment. FIG. 4, and each other flow diagram in the drawing figures or process description in the text, is intended to disclose an algorithm or functional description that may be used as a basis of writing computer programs to implement the functions that are described herein and which cause a computer to operate in the new manner that is disclosed herein. Further, FIG. 4 and each other flow diagram or process description are provided to communicate such an algorithm at the same level of detail that is normally used, by persons of skill in the art to which this disclosure is directed, to communicate among themselves about plans, designs, specifications and algorithms for other computer programs of a similar level of complexity.

The process 400 may start at step 402. In step 402, application listener 111 is programmed or configured to listen for changes to a configuration file at a service application 102. A change to a configuration file may include a newly added configuration file, a deleted configuration file, or a modification made to an existing configuration file. Application listener 111 may receive notifications from a service application 102 when service application 102 changes a configuration file. Application listener 111 may be able to detect when a service application 102 comes online or goes offline, and can thus determine that a configuration file associated with service application 102 is currently useable or not. In another embodiment, application listener 111 monitors service application 102 for changes to a configuration file. In another embodiment, application listener 111 monitors a file path and/or directory associated with service application 102 to detect change(s) to a configuration file in the file path and/or directory. The process 400 may then proceed to step 404.

In step 404, application listener 111 is programmed or configured to detect a change to a configuration file of a service application 102. The process 400 may then proceed to step 406.

In step 406, application listener 111 is programmed or configured to store mapping data in application registry 113 based on the configuration file that was detected to have been changed. The mapping data stored in application registry 113 may include a mapping of one or more designated resource item types that the service application 102 can process. The mapping data stored in application registry 113 may include one or more user actions that the service application 102 can use for processing a resource item. The mapping data stored in application registry 113 may include one or more priorities associated with service application 102. The mapping data stored in application registry 113 may include any other configuration setting included in the configuration file.

Process 400 thus provides a technique for detecting changes to configuration files of service application 102 that can dynamically update mapping data stored in application registry 113, without requiring the catalogue system 110 to be restarted or modifying a configuration file associated with catalogue system 110. Process 400 allows for catalogue system 110 to adapt to newly added, removed, and/or modified service applications 102A, 102B, 102N in real-time, thus allowing the catalogue system 110 to dynamically provide information about the processing capabilities of service applications 102 through 102N.

Figure 5:
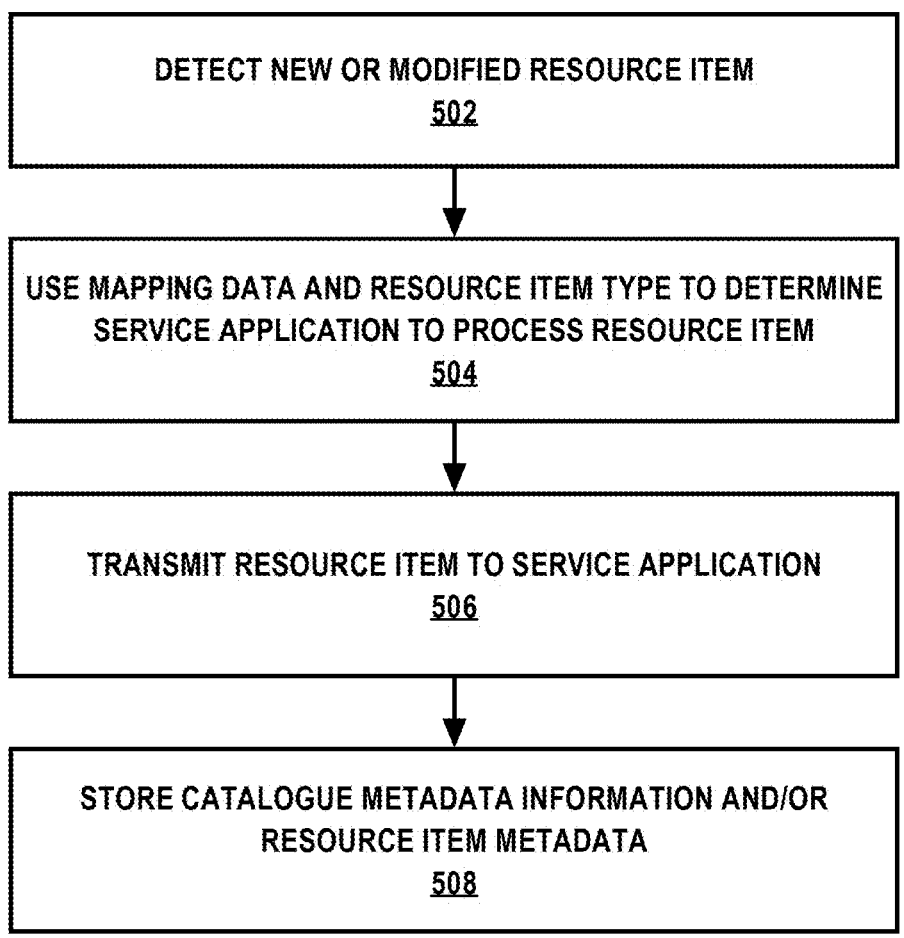
FIG. 5 illustrates a flow diagram for a process for detecting and processing resource items, according to one embodiment.

FIG. 5 illustrates a flow diagram of an example process 500 for detecting and processing resource items at a client. The process 500 may start at step 502.

In step 502, application director 115 is programmed or configured to detect a change to a resource item. The detected change to a resource item may be detected at client 130, at one or more of service applications 102A, 102B, 102N, or at one or more of data stores 140A, 140B, 140N. A change to a resource item may include a newly created resource item, uploaded resource item, a modified resource item, or received resource item. For example, in one embodiment, a detected change to a resource item may include uploading a new resource item at a client 130. In one embodiment, a change to a resource item may be detected using user interface 200 or user interface 300. The change to a resource item may be detected, for example, by uploading a file via a user interface at client 130. In another embodiment, a change to a resource item may include deletion of a resource item. In another embodiment, a change to a resource item may include a conversion of a resource item type of a resource item. For example, a ".csv" file may be converted to an ".xls" file at a service application 102A. Once the change to a resource item has been detected, the process 500 may then proceed to step 504.

In step 504, application director 115 is programmed or configured to use mapping data stored in application registry 113 and the resource item detected in step 502 to determine a service application to process the resource item. In the example above for TABLE A, a new resource item at a client device may be a new JPG file. In step 504 the application director 115 is programmed or configured to determine that the ACME service application can be used for processing files that match a resource item type with a file name that matches the expression "*.jpg". Thus, in this example, the application director 115 can determine that the new JPG file can be processed by the ACME service application. The process 500 may then proceed to step 506.

In step 506, application director 115 is programmed or configured to transmit the resource item to the service application determined in step 504. Thus, the application director 115 is able to route the resource item to the appropriate service application 102, based on the resource item type. This allow for dynamic handling of resource items, based on the resource item type of the resource item, and the mapping data detected and stored from available service applications. In another embodiment, the application director 115 may merely notify the service application of the resource item instead of, or in addition to, transmitting the resource item to the service application. The process 500 may then proceed to step 508

In step 508, resource item catalogue 117 is programmed or configured to store catalogue metadata information regarding the resource item that was transmitted in step 508. The catalogue metadata information may include a unique identifier for the resource item, a unique identifier for the service application that received the resource item, and/or a relative path or location of the resource item at the service application. The relative path and/or location of the resource item at the service application may be provided by the service application to the catalogue system 110 via a notification. Thus, resource item catalogue 117 may be used for subsequently locating the resource item. In one embodiment, resource item catalogue 117 may be further programmed or configured to store any additional resource item metadata for the resource item that may be helpful in identifying or locating the resource item. The process 500 may then end.

The process 500 thus provides techniques for automatically detecting changes to resource items at client 130, service application 102A, 102B, or 102N, or at data store 140A, 140B, 140N. The process 500 may be used for routing the resource item to the appropriate service application 102 for further processing. The process 500 also allows for catalogue system 110 to store data in a resource item catalogue 117 to keep track of the location and other information regarding the metadata. Thus, catalogue system 110 may be used as a card catalogue for resource items stored and being processed across various service applications 102A, 102B, 102N.

Figure 6:
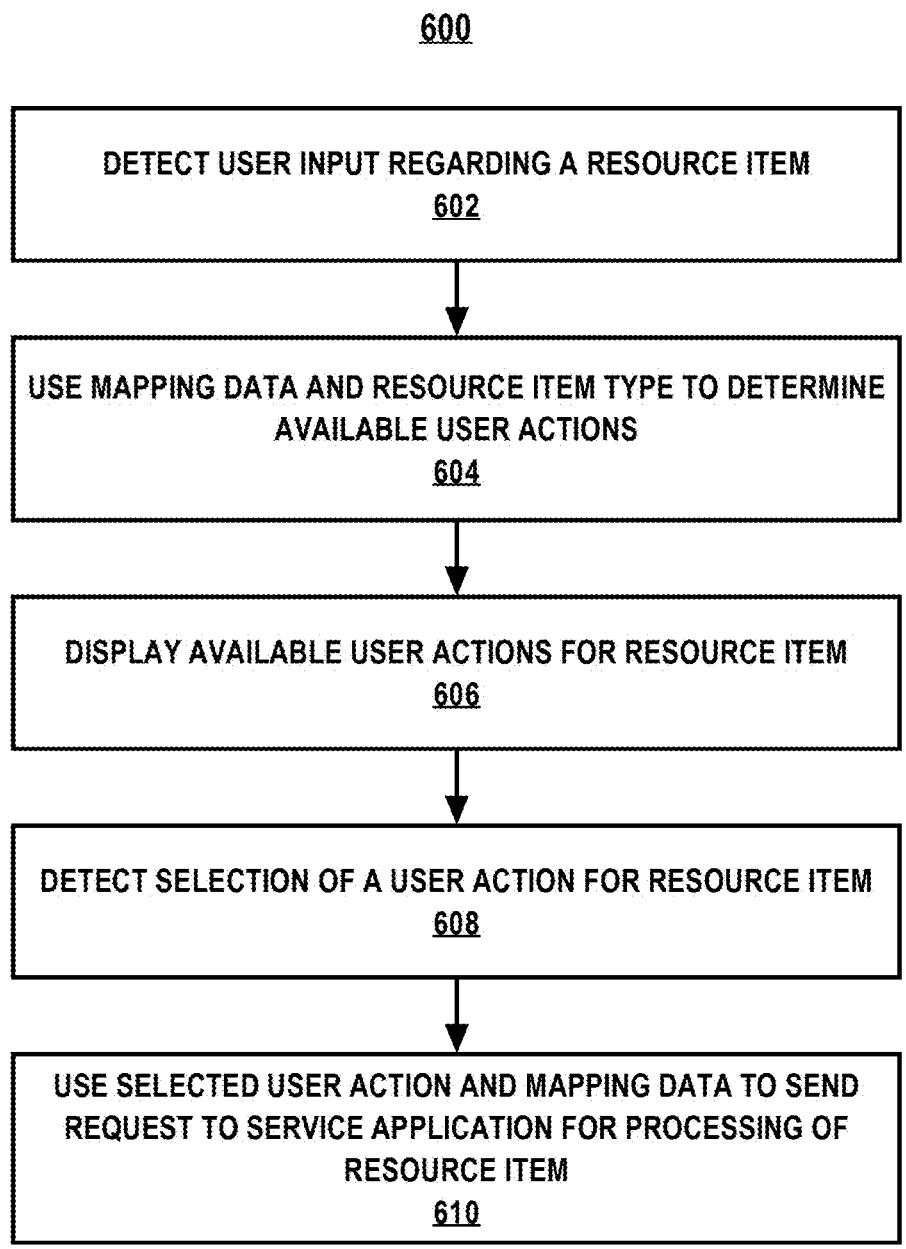
FIG. 6 illustrates a flow diagram for a process for executing user actions, according to one embodiment.

FIG. 6 illustrates a flow diagram of an example process 600 for executing user actions on a resource item. The process 600 may start at step 602.

In step 602, the catalogue system 110 is programmed or configured to detect a user input regarding a resource item. User input can be any computer-implemented user input, such as a touch gesture, mouse input, button input, keyboard input, or any similar user input. In one embodiment, user input can be detected at client 130. The process 600 may then proceed to step 604.

In step 604, catalogue system 110 is programmed or configured to use mapping data stored at application registry 113 to determine one or more available user actions for further processing of the resource item. In the example above illustrated in TABLE A, the user actions may include "View Image" or "Edit Image" using the ACME service application for a resource item that is a "*.jpg"" resource item type. The process 600 may then proceed to step 606.

In step 606, catalogue system 110 is programmed or configured to cause to be displayed on the one or more available user actions for further processing of the resource item. In one embodiment, the one or more available user actions for further processing are caused to be displayed on client 130. For example, user interface 300 includes an example of a popup window 310 that includes options for user actions 312 and 314 that are displayed. The process 600 may then proceed to step 608.

In step 608, catalogue system 110 is programmed or configured to detect the selection of one of the user actions displayed. The selection of a user action can be performed via any computer-implemented user-input, including, but not limited to touch gesture, mouse input, button input, keyboard input, or any similar user input. In one embodiment, the detecting of the selection of one of the user actions displayed is performed at client 130. The process 600 may then proceed to step 610.

In step 610, catalogue system is programmed or configured to use to the selected user action from step 608 as well as the mapping data stored in application registry 113 to transmit a request to the appropriate service application for processing the user action on the resource item. In one embodiment, this step may also use data stored in resource item catalogue 117 to determine the location of the resource item at the service application. The process 600 may then end.

Process 600 thus provides for dynamically generated user actions to be displayed, based on the stored mapping data at application registry and the available user actions as determined from detecting changes to configuration files associated with service applications. This allows for dynamic processing of resource items based on available service applications.

4.0 Implementation Mechanisms—Hardware Overview

Figure 7:
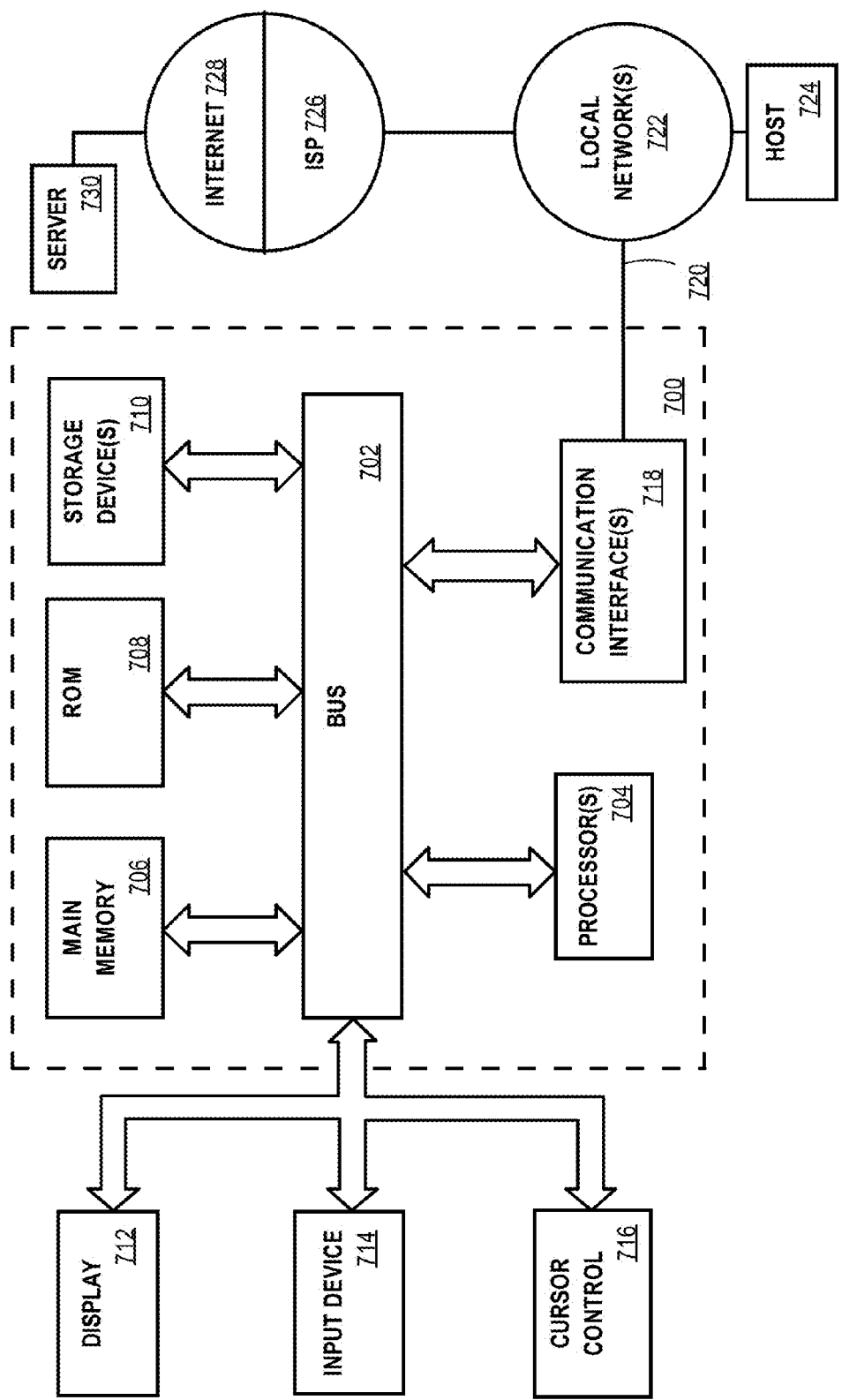
FIG. 7 is a block diagram of a computing device in which the example embodiment(s) of the present invention may be embodied.

Referring now to FIG. 7, it is a block diagram that illustrates a computing device 700 in which the example embodiment(s) of the present invention may be embodied. Computing device 700 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general purpose microprocessor, a system on a chip (SoC), or other processor.

Main memory 706, such as a random access memory (RAM) or other dynamic storage device, also may be coupled to bus 702 for storing information and software instructions to be executed by processor(s) 704. Main memory 706 also may be used for storing temporary variables or other intermediate information during execution of software instructions to be executed by processor(s) 704.

Software instructions, when stored in storage media accessible to processor(s) 704, render computing device 700 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and software instructions for processor(s) 704.

One or more mass storage devices 710 may be coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 710 (e.g., the main hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 7, one or more of display 712, input device 714, and cursor control 716 are external components (i.e., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such software instructions may be read into main memory 706 from another storage medium, such as storage device(s) 710. Execution of the software instructions contained in main memory 706 cause processor(s) 704 to perform the functions of the example embodiment(s).

While functions and operations of the example embodiment(s) may be implemented entirely with software instructions, hard-wired or programmable circuitry of computing device 700 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor(s) 704 for execution. For example, the software instructions may initially be carried on a magnetic disk or solid-state drive of a remote computer. The remote computer can load the software instructions into its dynamic memory and send the software instructions over a telephone line using a modem. A modem local to computing device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the software instructions. The software instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution.

5.0 Implementation Mechanisms—Software Overview

Figure 8:
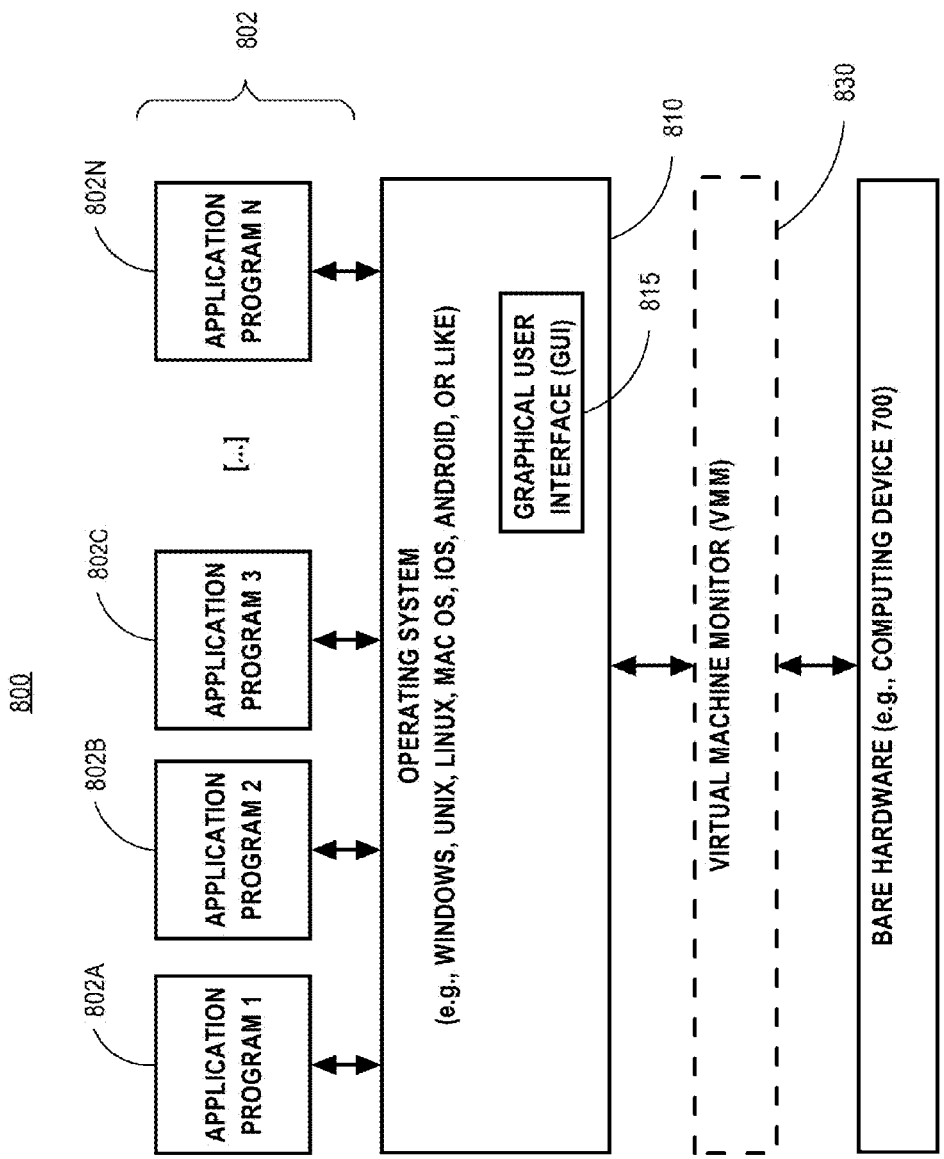
FIG. 8 is a block diagram of a software system for controlling the operation of the computing device.

FIG. 8 is a block diagram of a software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

The invention claimed is:

1. A method, comprising:
detecting a first change to a configuration file of a service application, wherein the configuration file comprises a designated resource item type and a user action that can be executed by the service application;
in response to detecting a first change to the configuration file, storing a first map entry in mapping data, wherein mapping data comprises a plurality of map entries and wherein the first map entry associates, based on the configuration file, the designated resource item type to the service application and wherein the first map entry associates, based on the configuration file, the user action to the service application;
detecting a second change to a particular resource item;
in response to detecting the change to the particular resource item, determining that the particular resource item has a first resource item type that matches the designated resource item type;
in response to determining that the particular resource item has the first resource item type that matches the designated resource item type, transmitting a copy of the particular resource item to the service application for processing;
in response to determining that the particular resource item has a resource item type that matches the designated resource item type, causing to be displayed on a client device an option to execute the user action on the copy of the particular resource item by the service application;
wherein the method is performed using one or more processors.

2. The method of claim 1, wherein detecting the first change to the configuration file comprises detecting that the configuration file has been created.

3. The method of claim 1, wherein detecting the first change to the configuration file comprises detecting that the configuration file has been modified.

4. The method of claim 1, wherein detecting the first change to the configuration file comprises polling a file path or directory associated with the service application.

5. The method of claim 1, wherein detecting the second change to the particular resource item comprises detecting that the particular resource item has been created, imported, or received.

6. The method of claim 1, wherein detecting the second change to the particular resource item comprises detecting that the particular resource item has been converted to a different format.

7. The method of claim 1, wherein the designated resource item type comprises a regular expression and wherein determining that the particular resource item has a first resource item type that matches the designated resource item type comprises applying the regular expression to the particular resource item.

8. The method of claim 1, further comprising:
storing a relative path of the particular resource item at the service application;
storing, based on the configuration file, a link for the user action; and
in response to detecting a selection of the option to perform the user action, using the relative path and the link to cause the service application to perform the user action on the particular resource item.

9. The method of claim 1, further comprising:
receiving a search query for a second resource item;
in response to receiving the search query, using the search query to search a plurality of metadata associated with a plurality of resource items previously processed by a plurality of service applications to generate a first search result; and
causing to be displayed the first search result.

10. The method of claim 1, further comprising:
storing a user access permission for a particular user account;
determining, based on the user access permission, whether the particular user account is allowed to view the particular resource item;
in response to determining that the particular user account is allowed to view the particular resource item, causing the particular resource item to be displayed to the particular user account; and
in response to determining that the particular user account is not allowed to view the particular resource item, causing the particular resource item to not be displayed to the particular user account.

11. One or more non-transitory computer-readable media storing instructions, wherein the instructions include:
instructions which, when executed by one or more hardware processors, cause, detecting a first change to a configuration file of a service application, wherein the configuration file comprises a designated resource item type and a user action that can be executed by the service application;
instructions which, when executed by one or more hardware processors, cause, in response to detecting a first change to the configuration file, storing a first map entry in mapping data, wherein mapping data comprises a plurality of map entries and wherein the first map entry associates, based on the configuration file, the designated resource item type to the service application and wherein the first map entry associates, based on the configuration file, the user action to the service application;
instructions which, when executed by one or more hardware processors, cause, instructions which, when executed by one or more hardware processors, cause, detecting a second change to a particular resource item;
instructions which, when executed by one or more hardware processors, cause, in response to detecting the change to the particular resource item, determining that the particular resource item has a first resource item type that matches the designated resource item type;
instructions which, when executed by one or more hardware processors, cause, in response to determining that the particular resource item has the first resource item type that matches the designated resource item type, transmitting a copy of the particular resource item to the service application for processing;
instructions which, when executed by one or more hardware processors, cause, in response to determining that the particular resource item has a resource item type that matches the designated resource item type, causing to be displayed on a client device an option to execute the user action on the copy of particular resource item by the service application.

12. The one or more non-transitory computer-readable media of claim 11, wherein the instructions for detecting the first change to the configuration file comprises detecting that the configuration file has been created.

13. The one or more non-transitory computer-readable media of claim 11, wherein the instructions for detecting the first change to the configuration file comprises detecting that the configuration file has been modified.

14. The one or more non-transitory computer-readable media of claim 11, wherein the instructions for detecting the first change to the configuration file comprises polling a file path or directory associated with the service application.

15. The one or more non-transitory computer-readable media of claim 11, wherein the instructions for detecting the second change to the particular resource item comprises detecting that the particular resource item has been created, imported, or received.

16. The one or more non-transitory computer-readable media of claim 11, wherein the instructions for detecting the second change to the particular resource item comprises detecting that the particular resource item has been converted to a different format.

17. The one or more non-transitory computer-readable media of claim 11, wherein the designated resource item type comprises a regular expression and wherein the instructions for determining that the particular resource item has a first resource item type that matches the designated resource item type comprises applying the regular expression to the particular resource item.

18. The one or more non-transitory computer-readable media of claim 11, further comprising:
   instructions which, when executed by one or more hardware processors, cause, storing a relative path of the particular resource item at the service application;
   instructions which, when executed by one or more hardware processors, cause, storing, based on the configuration file, a link for the user action; and
   instructions which, when executed by one or more hardware processors, cause, in response to detecting a selection of the option to perform the user action, using the relative path and the link to cause the service application to perform the user action on the particular resource item.

19. The one or more non-transitory computer-readable media of claim 11, further comprising:
   instructions which, when executed by one or more hardware processors, cause, receiving a search query for a second resource item;
   instructions which, when executed by one or more hardware processors, cause, in response to receiving the search query, using the search query to search a plurality of metadata associated with a plurality of resource items previously processed by a plurality of service applications to generate a first search result; and
   instructions which, when executed by one or more hardware processors, cause, causing to be displayed the first search result.

20. The one or more non-transitory computer-readable media of claim 11, further comprising:
   instructions which, when executed by one or more hardware processors, cause, storing a user access permission for a particular user account;
   instructions which, when executed by one or more hardware processors, cause, determining, based on the user access permission, whether the particular user account is allowed to view the particular resource item;
   instructions which, when executed by one or more hardware processors, cause, in response to determining that the particular user account is allowed to view the particular resource item, causing the particular resource item to be displayed to the particular user account; and
   instructions which, when executed by one or more hardware processors, cause, in response to determining that the particular user account is not allowed to view the particular resource item, causing the particular resource item to not be displayed to the particular user account.

* * * * *